US012700048B1

(12) United States Patent
Takacs

(10) Patent No.: US 12,700,048 B1
(45) Date of Patent: Aug. 4, 2026

(54) AUTOMATED UTILITY DISPENSING SYSTEM FOR TRANSIENT ACCOMMODATIONS

(71) Applicant: Elizabeth Georgina Takacs, Pearland, TX (US)

(72) Inventor: Elizabeth Georgina Takacs, Pearland, TX (US)

( * ) Notice: Subject to any disclaimer, the term of this patent is extended or adjusted under 35 U.S.C. 154(b) by 505 days.

(21) Appl. No.: 18/209,063

(22) Filed: Jun. 13, 2023

Related U.S. Application Data

(60) Provisional application No. 63/351,437, filed on Jun. 13, 2022.

(51) Int. Cl.
| | |
|---|---|
| *G06Q 50/06* | (2024.01) |
| *E03B 9/02* | (2006.01) |
| *G01D 4/00* | (2006.01) |
| *G01D 11/24* | (2006.01) |

(52) U.S. Cl.
CPC ............. *G06Q 50/06* (2013.01); *G01D 4/002* (2013.01); *G01D 11/24* (2013.01); *E03B 9/025* (2013.01)

(58) Field of Classification Search
CPC ........ G06Q 50/06; G01D 4/002; G01D 11/24; E03B 9/025
See application file for complete search history.

(56) References Cited

U.S. PATENT DOCUMENTS

| | | | |
|---|---|---|---|
| 5,946,660 A * | 8/1999 | McCarty | ................... G07F 7/00 705/5 |
| 7,252,227 B2 | 8/2007 | Chase | |
| 7,364,069 B2 | 4/2008 | Chase | |
| 9,779,365 B2 * | 10/2017 | Smullin | ................. G06Q 10/02 |
| 10,211,004 B2 | 2/2019 | Wootten et al. | |
| 10,414,357 B1 | 9/2019 | Sorensen | |
| 10,595,544 B2 * | 3/2020 | Beth Halachmi | ...... A23G 9/045 |
| 11,128,934 B2 * | 9/2021 | Thomas | ................... H04B 5/70 |
| 11,135,985 B2 | 10/2021 | Sorensen | |
| 11,215,958 B1 * | 1/2022 | Turntine | ................ G08G 1/149 |
| 12,281,463 B1 * | 4/2025 | Turntine | ................ G06Q 10/30 |
| 12,469,595 B2 * | 11/2025 | Chamberlain | ......... G16H 40/20 |
| 2008/0304212 A1 | 12/2008 | Seff et al. | |
| 2023/0036188 A1 * | 2/2023 | Schmidt | ............ G06Q 20/3278 |

* cited by examiner

*Primary Examiner* — Michael Collins

(57) ABSTRACT

An automated utility dispensing system may streamline and automate the provision of utilities as licensed services to transient guests. A comprehensive solution is provided that automates utility dispensing. The system comprises a housing structure enclosing various components, including a discriminating module for remote operation and control of utility services, a Wi-Fi amplifier for enhanced wireless connectivity, and a range of outlets with breakers for delivering power to transient guests. Additionally, the system features a water utility system with water handles, faucet connection points, a water control switching device, and a water distribution line. Hardwired service lines connect the system to utility sources, while additional components such as an antenna attachment, payment and identification facilitation tools, cameras, motion sensors, lights, and a user-friendly interface enhance functionality and security.

20 Claims, 9 Drawing Sheets

AUTOMATED UTILITY DISPENSING SYSTEM FOR TRANSIENT ACCOMMODATIONS

CROSS-REFERENCE TO RELATED PATENT APPLICATION(S)

This application is a non-provisional, and claims the benefit of, U.S. Provisional Application No. 63/351,437, filed, Jun. 13, 2022, the disclosure of which is incorporated by reference in its entirety.

COPYRIGHT NOTICE

TECHNICAL FIELD

This disclosure relates to an enhanced utility dispensing system device and a discriminating module for operating remotely, which together automate the provision of utilities as licensed services to transient guests. A web-based control interface may eliminate the requirement for a continuously staffed office, enabling campers to access and pay for services conveniently at any time. Other features may include transient guest agreements, service selection, payment processing, and the automated termination of services upon completion of the selected term.

BACKGROUND

Remotely controlled switching devices have improved convenience for home and office users, allowing them to remotely control lights and climate systems. However, the adoption of such devices in commercial and rental properties lags behind individual consumer markets. RV pedestals play a vital role in recreational campgrounds, providing power and water services to campers. Currently, campers have to visit a staffed office to pay for these services, which requires knowledgeable personnel to make the services available. This method necessitates physical presence and expertise, increasing operational costs. Additionally, the rigid construction of pedestals poses a risk of damage and requires careful maneuvering.

Moreover, legal ambiguity arises in lodging locations, where the distinction between providing services to transient guests and establishing landlord-tenant relationships is not always clear. This ambiguity subjects them to different legal statutes, causing confusion. The existing method of physically staffed offices for service provision in campgrounds is inconvenient for campers and leads to increased operational costs. There is also a need to address the limited adoption of remotely controlled switching devices in commercial and rental properties.

SUMMARY

Embodiments of the present disclosure may provide a utility dispensing system for automating dispensation of utilities as licensed services, comprising: a housing structure for enclosing and protecting the components of the system; a discriminating module capable of remote operation to govern provision and cessation of utilities as licensed services; a Wi-Fi amplifier to enhance wireless connectivity and enable remote control capabilities; a plurality of outlets equipped with breakers for delivering power to the transient guests; a water utility system comprising: a plurality of water handles spigots comprising: a plurality of faucet outlet connection points; and a water control switching device for managing the water supply; and a water line to facilitate distribution of water to designated areas; hardwired service lines for connecting the utility dispensing system to the utility sources; an antenna for enhancing communication and signal reception; a card reader for facilitating payment and identification of transient guests; a radio frequency identification (RFID) chip reader for reading and verifying RFID tags or cards; a full ID scanner for scanning and verifying identification documents; at least one camera for monitoring and surveillance purposes; a plurality of motion sensors for detecting movement and triggering automated actions; a plurality of lights for illuminating the surrounding area and enhancing security; and a plurality of speakers for audio notifications and alerts. The system also may include a cover to provide additional protection and aesthetics for the utility dispensing system; a rugged undercoating type material for coating the utility dispensing system, offering durability and resistance against environmental elements; and an ultraviolet (UV) screen protector to shield the utility dispensing system screen from UV damage. The system may further include a utility dispensing system screen for displaying information and user interfaces. The system also may include a quick response (QR) code to be read by a QR reader which may be handheld device for facilitating quick and convenient access to information or services. The plurality of outlets equipped with breakers include 50/30/20 amp outlets. The water control switching device includes a pressure sensor for monitoring and regulating water pressure. The system may include a weatherproof enclosure for protecting the utility dispensing system from environmental elements.

The discriminating module may perform one or more functions selected from the group comprising: receiving and validating user identification information, displaying agreements for transient guest acceptance, controlling activation and deactivation of utilities based on predetermined parameters, collecting, processing, and storing user-submitted data, enabling and disabling restricted service based on predetermined parameters, terminating dispensing of services upon expiration of purchased services, connecting to predetermined payment processing options, controlling flow of power as a restricted service, controlling flow of water as a restricted service, controlling internet signal access as a restricted service, receiving user identification documents, and receiving user adjustment of payment methods. The discriminating module may include an end-user accessible navigable menu accessible from any location, wherein an end user is capable of directly controlling the system within an active service period. The discriminating module may include smart Wi-Fi meters. The discriminating module also may include a user-accessible hub available for utilization during an active service period, the user-accessible hub capable of allowing user control of service restriction or dispensing and/or allowing adjustment of a service period in compliance with an agreement. The discriminating module may provide one or more options for contact with a controller of the system. The discriminating module may provide more than one predetermined notification of expiration of a service period, the notification allowing for reactivation or extension of the service period. The water control switching device may be configured to regulate flow and temperature of water to the designated areas.

Other embodiments of the present disclosure may provide a method for automating dispensing utilities as licensed services using a utility dispensing system, the method comprising the steps of: providing an end-user accessible navigable menu on the utility dispensing system, the menu accessible from any location; collecting, processing, validating, and storing transient guest-submitted data, the transient guest-submitted data including at least identification information; verifying payment for the utilities as licensed services; receiving guest acceptance of an agreement displayed on the menu; activating the utilities as licensed services; monitoring consumption of the activated utilities as licensed services; and automatically deactivating the utilities as licensed services upon completion of a service duration or when a transient guest requests deactivation. The method also may include generating usage reports and billing information based on consumed utilities as licensed services; and providing access to usage reports and billing information to authorized personnel through a user interface. The method may further include performing remote diagnostics and troubleshooting of the utility dispensing system using a remote monitoring and control system; and maintaining the security and integrity of the utility dispensing system through one or more of cameras, motion sensors, and alarms. The method also may include providing one or more notifications to the transient guest, the notifications selected from the group comprising: notifications of remaining balance or usage limit of the utilities as licensed services, consumption of the utilities as licensed services, end of service period, issues with service. The method may further include generating invoices or receipts for the utilities as licensed services. The method also may include integrating with a central management system to collect and analyze data regarding utility consumption, billing, and operational performance of the utility dispensing system.

BRIEF DESCRIPTION OF THE DRAWINGS

In order to fully understand the embodiments in this disclosure, reference is made to the accompanying drawings. The disclosure describes aspects and embodiments in the following description, with reference to the drawings or figures (FIG.) in which numbers represent the same or similar elements. It is understood that these drawings are not intended to be limiting, but rather to describe the various embodiments with additional detail through the use of accompanying drawings.

DETAILED DESCRIPTION

Figures 1A, 1B:
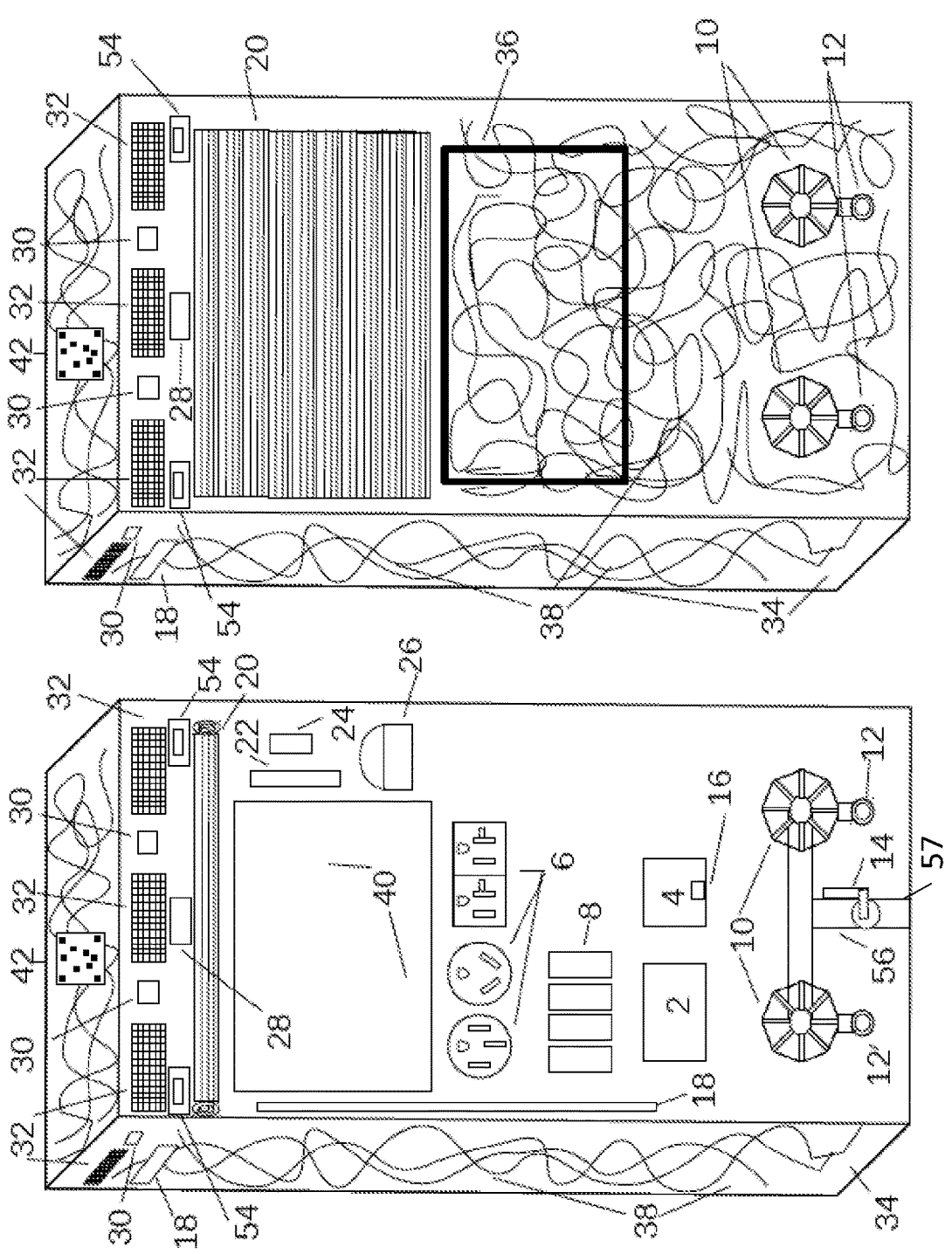
FIG. 1A depicts an internal view of a utility dispensing system device including a discriminating module device, a Wi-Fi amplifier, and other enhancements according to an embodiment of the present disclosure.
FIG. 1B depicts an external view of the device of FIG. 1A when not in active service.

In the following description, numerous specific details are set forth to provide a thorough understanding of various embodiments. However, one skilled in the relevant art will recognize that the embodiments described herein can be practiced without one or more specific details or with other methods, components, materials, etc. In other instances, well-known structures, materials, or operations are not shown or described in detail to avoid obscuring certain aspects.

Embodiments of the present disclosure may address limitations faced by recreational campgrounds and lodging locations in delivering utilities and services to transient guests. By incorporating a new use method for automating utility dispensing, embodiments of the present disclosure may revolutionize the way services are provided to transient guests.

In accordance with various embodiments, this disclosure presents a device and method that may automate the utility distribution in transient accommodations, such as recreational campgrounds and lodging locations. The introduction of remotely controlled switching devices has greatly improved the convenience and quality of life for individual consumers in residential and commercial settings. These devices allow the transient guests to remotely activate lights and control climate settings, providing a heightened level of flexibility and comfort. However, the adoption of such technologies in the commercial and rental property sectors has been relatively limited compared to individual consumer markets. Recreational campgrounds commonly rely on recreational vehicle (RV) pedestals to provide essential services such as power and water to campers.

The automated utility dispensing system according to embodiments of the present disclosure may eliminate the need for a constantly staffed office, reducing operational costs, providing convenience for campers with 24/7 access to services, establishing clear transient guest status separate from landlord-tenant relationships, and enabling efficient and secure business transactions through automated means. By incorporating these features, the automated utility dispensing system revolutionizes the delivery of services in transient accommodations, streamlining operations and improving the overall experience for both service providers and campers.

Embodiments of the present disclosure may include a discriminating module for operating remotely to govern the provision and cessation of utility services. The discriminating module may be part of the utility dispensing system device and may be operated remotely through a web-based control interface, such as through a website. Using a web-based control interface, campers can access services remotely, select preferred services and duration, review service prices and rules, provide identification, undergo optional background checks, and process payment using various payment options. Accordingly, the check-in process for transient guests who purchase services may be automated. The discriminating module may automatically terminate access to services at the end of the chosen term, prompting campers to renew or vacate the space if services are no longer needed. Embodiments of the present disclosure may incorporate a legal contract, presented as an end-user license agreement, which campers must agree to before receiving any services. This may ensure clarity and mutual understanding between the parties involved. The discriminating module may monitor power transmitted through it. The amount may be saved and accessible for viewing, eliminating the need for separate meters. Power usage can be billed based on this data.

It should be appreciated that embodiments can combine the described aspects in any way. All statements herein relating to principles, aspects, and embodiments are intended to include both structural and functional equivalents. Additionally, such equivalents are intended to include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "embodiments" or similar language means that a particular aspect, feature, structure, or characteristic described in connection with the embodiment is included in at least one embodiment. Thus, appearances of the phrases "in one case," "in at least one embodiment," "in an embodiment," "in certain cases," and similar language throughout this specification may, but do not necessarily, all refer to the same embodiment or similar embodiments. Furthermore, aspects and embodiments described herein are merely by way of example, and should not be construed as limiting of the scope or spirit of the disclosure as appreciated by those of ordinary skill in the art. Furthermore, to the extent that the terms "including", "includes", "having", "has", "with", or variants thereof are used in either the detailed description and the claims, such terms are intended to be inclusive in a similar manner to the term "comprising." In embodiments showing multiple similar elements, such as storage devices, even if using separate reference numerals, some such embodiments may work with a single element filling the role of the multiple similar elements.

Referring now to FIG. 1A, there is shown an automated utility dispensing control panel embodiment for transient accommodations that may include discriminating module 2 for operating remotely to govern the provision and cessation of utility services. The discriminating module 2 can also be paired with the addition of one or more Wi-Fi amplifiers 4 to aid in campers receiving the signal within their RVs. This may ensure more seamless, reliable operation of the discriminating module. The panel also may include 50/30/20 amp outlets 6 with breakers 8 so that electrical outlets and all necessary components for 20, 30, and 50 amp outlets 6 with breakers 8, past the switching device may be used.

The panel may further include a plurality of water handles 10 each handle 10 having faucet outlet connection 12 with its own water control switching device 14 and water line 56. Water line 56 can also be incorporated into the utility dispensing control panel through a flexible hose run through protective sleeve 57, designed to meet code requirements of the point of use location, to provide all of the utilities needed at the site, flexibly. Water handle 10 and faucet outlet connections 12, with water control switching device 14, may also be included in the utility dispensing control panel.

Hardwired service lines 16 may be provided to improve on the Internet connection associated with the panel, such as to provide ethernet or networking through a hardwired connection or provide hardwired connection to other utilities. A closed-circuit network can serve the functions of presenting the agreement and rules, accepting the identification, and processing payments through hardwired service lines 16.

Card reader 22 and Radio frequency identification (RFID) Chip Reader 24 may be provided to process credit and/or debit card payments. Full ID scanner 26 may allow for scanning of magnetic strips associated with identification cards. However, it should be appreciated that one-tap or other reader technology may be used without departing from the present disclosure.

At least one camera 28 may be provided to confirm the person requesting the services matches the ID presented. IDs can be photographed for submission as an option. Cameras can thereafter be monitored by the owner or the transient guest, if left active. The transient guest can view their space from anywhere, to feel more secure, when away from their RV, campground, and belongings.

A plurality of motion sensors 30 and a plurality of lights 32 may be provided for round-the-clock accessibility. Campers can arrive even in the least visible conditions of night or foul weather, while only having to come within the range of the motion sensors, to be able to easily locate the automated utility dispensing control panel for space. Motion sensors 30 can be further used during the duration of stay for campers' security. Campers can choose to receive notifications for sensed motion. They also may choose the time periods in which they wish to receive these alerts. They can then choose to turn cameras 28 on, to see what triggered the motion. The campers can use motion sensors 30 in conjunction with lights 32 to choose whether they prefer lights to be constantly on after dark, or to be activated by the sensors. Also, they could choose whether they want them to come on with a certain level of light visibility, or at a certain predetermined time. Further, they could simply control the lights themselves being on or off manually, through their utility dispensing control panel, on any device of their choice, connected to the hub.

Utility dispensing control panel body structure 34 could be comprised of steel or other material suitable to withstand the elements. Owners may choose to coat structure 34 with rugged undercoating type material 38 to further prolong the life and/or to color it based on the best option for their needs. Neutral and natural colors could help it to blend in to provide more of a seamless camping experience, or other colors to match the brand and theme of the park and/or owner could also be selected. Cover 36 also may be provided in embodiments of the present disclosure. By upgrading utility dispensing control panel screens 40, owners can create point of service kiosks, not requiring connection to the internet. These may be touch-activated screens in embodiments of the present disclosure. The screen may have options for adjusting the brightness for lighting and text size for ease of use.

Clocks or timers can be utilized to determine when the service period has expired if needed. In this case, any options available to the camper, normally found in the transient guest accessible utility dispensing control panel, such as control over sensors, cameras, lights, power, water, renewal of service, etc., would be controlled on the screen of the utility dispensing control panel of their space. The utility dispensing control panel upgraded with a screen can also be connected to the internet, eliminating the need for campers to provide their own internet connected devices, but still providing them the option to if they so choose.

Quick response (QR) code 42 may be provided on utility dispensing control panel screen 40. Users may control their options by scanning/reading QR code 42 either from the utility dispensing control panel, or from the comfort of their RV or location of their choice.

Utility dispensing control panel screen 40 may be protected from elements with UV screen protector 20, in the form of a roll up door, or other form of covering. Use of protector 20 may prolong the life of the screen.

A plurality of speakers 54 also may be provided. Antenna 18 may be included to improve signal associated with the panel. It may be slidable for storage or attached in a plurality of ways depending on operator preference. By implementing this automated system, it offers an alternative solution to the need for constant staff presence and a physical user hub.

By providing campers with the utility dispensing control panel to access their options, they can be in control of several aspects during their stay. The business relationship can be defined by the agreement being presented and accepted before any services are rendered, thereby preventing theft of services. The campers can choose to deactivate their services, if they need to be away for a period of time, to prevent theft of metered services, but are not finished with their stay physically. They can control motion sensors and cameras for security, lights for their purposes, internet signal for their needs. They can upload new identification for new guests sharing the space with them if allowed within the agreement. They can access information of how much time is available of their currently purchased services, when they are expiring, and see options of pricing to purchase further services. They can review the rates of their metered services, and make adjustments, if available. They also have the option to purchase those services, with stored payment methods, have automatic billing, or add new accepted payment methods. Options for contacting the owner of the utility dispensing control panel can be included. A method for leaving public reviews can be available in the utility dispensing control panel as well.

Referring now to FIG. 1B, an automated utility dispensing control panel designed for transient accommodations during inactive periods according to an embodiment of the present disclosure is depicted. This embodiment may include UV screen protector 20, which may take the form of a roll-up door or other suitable covering, to protect utility dispensing control panel screen 40 and extend its lifespan. When the utility dispensing system is not in active service, UV screen protector 20 may shield utility dispensing control panel screen 40 and prevent damage from external elements such as UV rays. This protective feature may ensure the longevity and optimal functioning of utility dispensing control panel screen 40, enhancing the overall durability and reliability of the automated utility dispensing control panel.

In addition to the UV screen protector 20, cover 36 may serve as a shield for other components that do not need to be exposed when the system is not in service. Cover 36 may provide an extra layer of protection against environmental factors, preventing dust, debris, and moisture from affecting the internal components. By incorporating design elements that prioritize longevity and environmental resistance, the automated utility dispensing control panel can withstand various conditions and maintain its functionality over an extended period.

The combination of UV screen protector 20 component and cover 36 may ensure the durability and reliability of the utility dispensing system, even during periods of inactivity. These design features may contribute to the overall quality and longevity of the system, providing a robust solution that can withstand diverse environmental conditions.

Figures 2A, 2B:
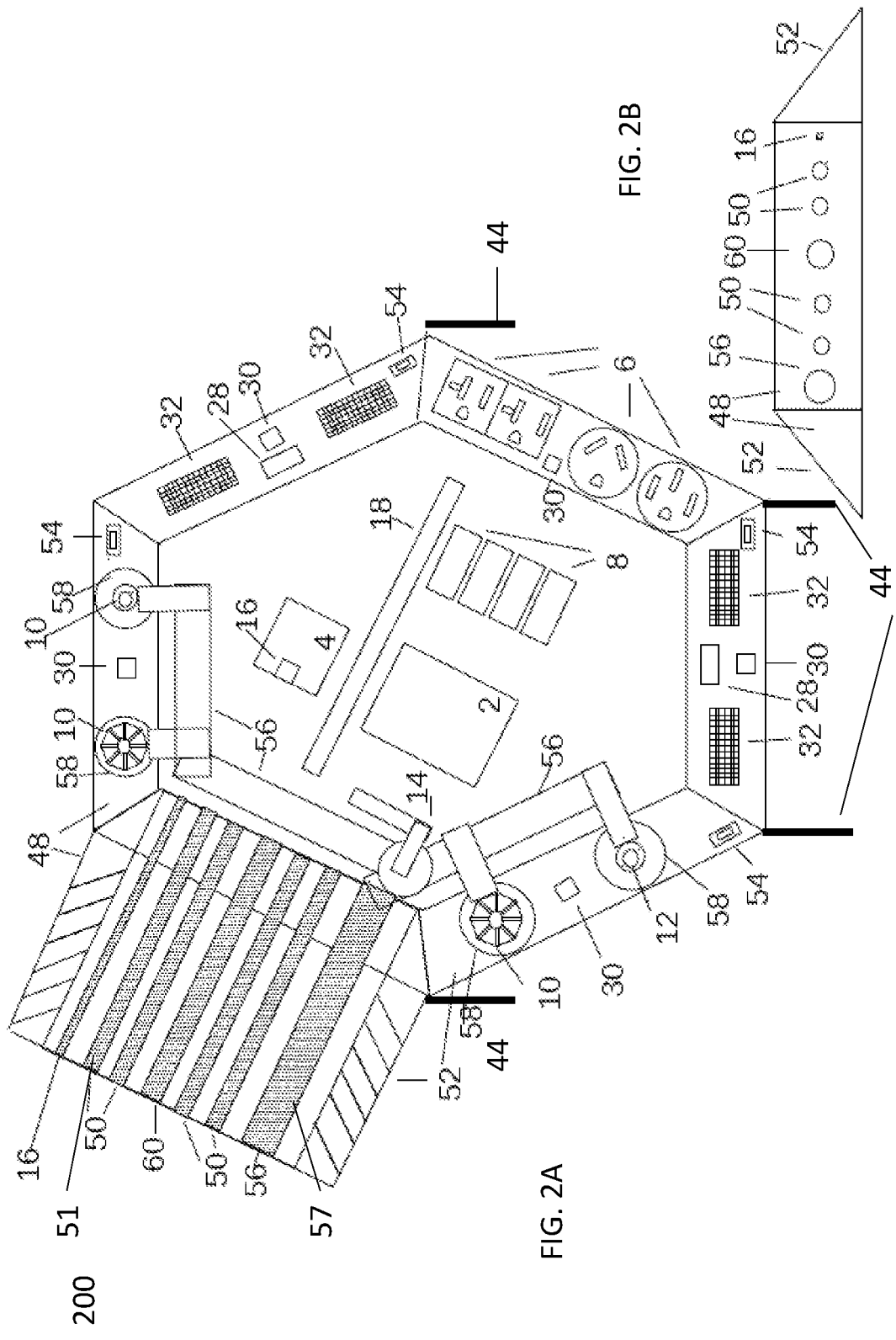
FIG. 2A depicts an internal view of a utility dispensing system including the device, a Wi-Fi amplifier, and additional enhancements according to an embodiment of the present disclosure.
FIG. 2B depicts a cross-sectional view of the extension cord panel showcasing the provision of hardwired service lines, wires, water line, and gas/propane line according to an embodiment of the present disclosure.

Referring now to FIG. 2A, automated extension cord panel 200 according to an embodiment of the present disclosure may feature a compact design that facilitates the efficient delivery of services to upgraded camping spots. It may withstand contact with vehicles. It is portable and can be positioned conveniently within reach of campers' power cords. The device blends into the surroundings, enhances aesthetics, and does not obstruct the physical or visual environment.

The material of automated extension cord panel 200 can provide a longer life with less threat of damage to a rigid structure, and less threat of rust from metal housing. The inner components are serviceable. There is no need to lock the device as power may be dispensed through a switch activated by the completion of the registration process through the website or network. It may be portable to provide more options in utilizing the area. Campers can park anywhere within reach of the device at the end of the supply wires in conjunction with their power cord's reach. It can be raised to protect from floods, elements, animals, or other low-lying hazards. It could be draped, or hungover existing site features or items brought by campers. It enhances the beauty of the surroundings by virtue of blending into the point of not being noticeable to the eye. It quietly serves its function without being in the way physically or visually.

Automated extension cord panel 200 may include discriminating module 2, Wi-Fi amplifier 4, antenna 18, and breakers 8 all positioned inside housing 48. Outlets for 50-, 30-, and 20-amp power 6 are accessible externally. Foldable feet 44 can be incorporated if desired to raise it to a predetermined height. Fold down handle 46 can be added to facilitate the positioning of the device at the desired location. A durable plasticized rubber material can provide housing 48 for the components. Power line wires 50 carrying the power to the site would be extended, encased, insulated, and shielded in protective material 51. The material would have slanted design 52 to its elevation, accepting the passing of vehicles over the wires and device without damage. This extended cord would be of the length suitable based on the available space. It could be only 5 ft, just to move it slightly side to side, or lengths up to whatever one would consider manageable, useful, and desirable.

Figure 2C:
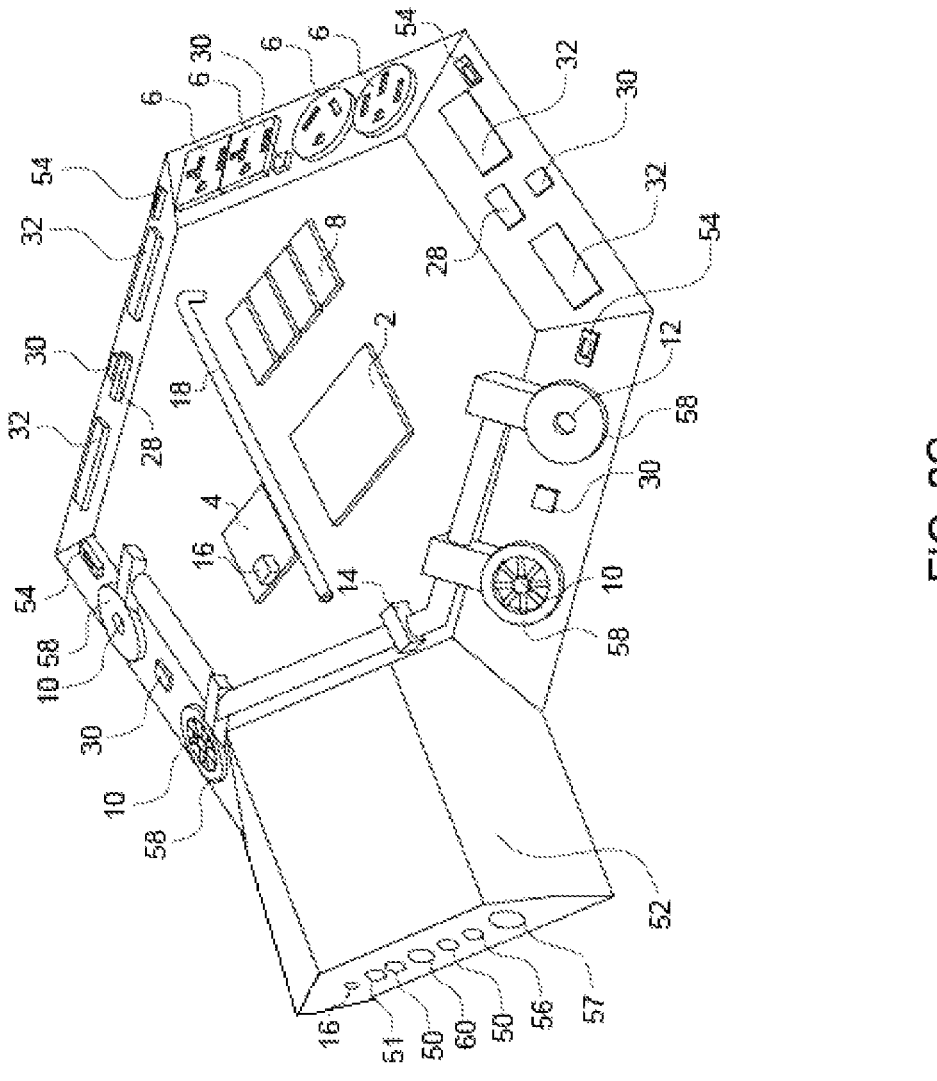
FIG. 2C depicts another view of a utility dispensing system according to an embodiment of the present disclosure.

FIG. 2C depicts another view of a utility dispensing system according to an embodiment of the present disclosure. Upgrade options would be available to aid in the location of the device, with motion sensors 30 activating lights 32 or alternatively sounds, from speakers 54.

Water line 56 can also be incorporated into the device through a flexible hose run through protective sleeve 57, designed to meet code requirements of the point of use location, to provide all of the utilities needed at the site, flexibly. Water control switching device 14 may be within the housing. Water handles 10 for turning on the water, as well as the faucet outlet connections 12, may be recessed 58, to maintain the traversable design.

Gas or propane line 60 of a flexible nature can also be incorporated into protective sleeve 57, with an optional switch to control the flow of that as well.

In accordance with one embodiment of the invention, the automated extension cord panel (referred to as device 200) features a compact design that facilitates the efficient delivery of services to upgraded camping spots. The device's reduced weight and manageable shape present various advantages, including cost savings on shipping and handling, as well as simplified installation procedures. Additionally, the device effectively mitigates the risk of damage resulting from vehicle contact, thereby significantly prolonging its expected lifespan. These inherent benefits not only contribute to cost savings concerning the utility dispensing system device but also minimize the necessity for labor-intensive repairs or reinstallation processes.

Referring now to FIG. 2B, a cross-sectional view of extension cord panel 200 according to an embodiment of the present disclosure is provided which may include hardwired service lines 16, power line wires 50, water line 56, and gas/propane line 60.

Extension cord panel 200 in the embodiment may incorporate slanted design 52 in its elevation. This slanted design ensures that the wires and device can withstand the passing of vehicles without incurring any damage. By angling the protective material, it allows vehicles to traverse over the wires and device smoothly, without causing any disruption or harm. The slanted design 52 serves as a practical solution to address the potential risks associated with vehicle contact. It provides a clear and safe pathway for vehicles to pass over the wires and device, mitigating the likelihood of accidental damage or interference. This design feature not only enhances the durability and longevity of the system but also minimizes the need for frequent repairs or replacements due to vehicle-related incidents.

A single inclusive web application may be programmed with the function to connect to smart Wi-Fi meter devices, calls automatically assigned to each device for ON, OFF, 1 DAY WARNING, 1 HOUR WARNING, RETRIEVE USAGE DATA, and opportunity to add others by user. Manual override on or off, can also be manually set to be active for time periods. Booking app shows unoccupied spaces as available. User can block times as unavailable. There may be a choice for guests of check in and activate "Now" or another time, and it may immediately bring up a calendar to select date and drop down menus for hour and minutes. Choice of time periods may be offered. Flexible selection for users, and an opportunity to adjust by user may be provided. Prices to each may be attached and enterable by user. Prices may be provided based on time durations in embodiments of the present disclosure. There may be a built-in page for agreements. A dashboard option for adding an agreement in various formats may be provided. There may be an option to download and reupload with signature, enter signature on page, or check box to accept. An option to upload a photo ID to show agreement may be selected. Additional pages for rules and special messages may be provided. Pop-ups also may be provided for additional messages. If a guest changes or adds additional photos at a later time in user hub, they will be resubmitted to be recognized and saved.

Payment processing options may be provided. Authorization codes for deposits may be embedded where available. The system may automatically charge the amount and reserve the deposit. Easy options may be provided for getting the money from deposit if needed. There may be an option to set up recurring monthly and one deposit, for long term. In an embodiment of the present disclosure, a merchant account may be established to act as a payment processor. Automated charging also may be provided to reserve the user-entered maximum deposit for the length of a stay and reauthorized as needed for the duration. There also may be an option to add other users in directory management and additional automations section. Other customizations such as photos, elements, or layout allowed.

Users may have access to implement the application on a website or application. They may have the ability to integrate it with an existing website. By installing the app, they will gain access to a user dashboard. From here, they will be able to view and use the user interface and customize certain aspects of the user dashboard and publicly displayed details to their preferences. There may be an option present to add devices. Initiating this option will show directions and user can begin the pairing of a device. Users may add an unlimited amount of devices. As they are added, they may appear in a list format in a chart. By clicking on a device name field on the chart, a user may bring up the device configuration menu again where the network, password, and name can be edited again.

Fields may be provided including, but not limited to, manual override always on/off, ON/OFF, 1 DAY WARNING, 1 HOUR WARNING, RETRIEVE USAGE DATA, Buffer Time, and possibly the opportunity to add others by user. These will be the automations that may communicate with the device directly. The warnings may also communicate independently of the actual device. There may be an option to apply selections to all devices in bulk, or edit each one's selections individually. For these different categories of selections, there may be further settings menus that can be navigated to, where detailed settings can be implemented. The on/off selection may be an option to let the booking application trigger the on/off function through API calls. When this is set to off, there may be another selection with the option to choose to manually leave switch on or off all the time, and a menu for other setting involved with manual management. The manual override settings menu can give the option to schedule manual time periods, which may be attached to a calendar. This can be where times are blocked as unavailable, by setting the manual off times. There can be an option to display those times as unavailable on the public booking calendar. The settings may have a button which may be designed to be grayed or otherwise distorted and only available to manipulate when the "on/off option" is disabled. It may distinguish between on and off on through the distortion. When manual on/off is enabled, it may also show the distinguished state indications, possibly more obviously, and not be distorted, showing more obviously. The display of these features could be customized by the user if desired. This setting could be useful for example to tell the switch to remain on even if WIFI signal is lost, or to remain off because repairs are being made, area closed, etc. The warning options can be programmed to function in different ways as examples, either be set up by a call setting a timer or countdown on the device and the device notifying when threshold reached, or by creating automation to be sent in user determined time after purchase, based on selection. Settings buttons can give the option to schedule exactly when the message is sent, what the message says, how it looks and where it is sent to, such as allowing guest to request it to phone number as text or call, email, etc. The retrieve usage data menu could offer options to set if customers can request it, how they request it, how they receive it, and how it will look. There should also be a place where user can see all usage data, like a data dashboard, which can appear in their user hub in an embodiment of the present disclosure. Another menu could show customizable options for automations that will be carried out through the application and website, which do not communicate directly with the device. There may be options to allow or disallow immediate activation, which would be informing the app if it can allow it to make the API call to the device or not upon successful completion of payment processed. An option to allow scheduled activation could provide a menu where they can set the options for the selection calendar display, the time drop down menus, options for displaying these options, such as time format and zone, the increments to display the available time blocks in, etc, where guests would be able to make their selections from for the option of future reservation instead of immediate activation. An option to upload or create a map in a small map editor application may also be offered. Users could create an image or provide one, and indicate amenities unique to spaces, add interactive selections for guests, where they could view photos or videos of specific spaces or places, or show other options or information. If add buffer time selection is set to on, the length of the buffer time can be specified in the settings menu for this option. These fields in the chart can either show No or N/A or show the time they chose in the settings if yes. Time block/durations available setting selections in a separate menu will be where they can check boxes of pre-provided times of 1 hour, 3 hours, 12 hours, 24 hours, 3 days, 1 week, 2 weeks, 1 month, or the option to add custom options. These selections being chosen should provide a drop-down menu in the fields on the settings chart where they can select each they would like to provide. When they select one, a "+" appears to add another of the selected options from the menu selections, with unlimited additions possible. One way this could be displayed to the user is with the time options having "x"s next to them. If they x one out, it will remove the corresponding price. A "+" would always be at the end of the list to bring up a drop-down menu that shows any of the selected options that were "x"-ed out of, to add them back. No "+" when none have been x-ed out. Accordingly, it may be editable from the one page for simplicity, seeing it all at once, not having to load the menu for the selection chart for each. Clicking in the field would take you back to the time duration settings selection menu chart. These selected duration options will be shown to the guest on the service page before the calendar, or possibly on the same page as the calendar, adjacent to it, so they can choose on the same page the duration and move to the dates, so they can adjust either without navigating from the page. They may see these options with the map instead of a list of spaces. In this way, all the variables of date, duration, and space can appear and be selected from the same guest accessible page.

A pricing menu may take you to a prepopulated chart of the previously selected time blocks, where number values can be added for each of the duration options that have been selected. If a user only wishes to provide one single duration, it could be simplified by allowing the price to be entered in the fields directly related to each, foregoing the need to navigate to the mini sub menu correlated to this function. There may need to be a selection for this option in the mini menu, to enter price for one duration directly in field, and also the option to apply this setting to all of these pricing fields, if only one duration is offered across all devices. An option to apply duration and correlated pricing to all can be shown on this settings menu, to apply in bulk from here. A confirmation message explaining the result of accepting this function may appear for user to understand and agree.

A page can exist after guest selections and before check out for agreement options. An option for uploading documents in any format or multiple files that will be displayed on the page for guest to choose from can be provided. A function to convert provided uploaded documents from file to text on webpage could be included, possibly with a disclaimer describing possible file types supported for this function. A setting menu for selection of this function would let them adjust font and appearances, the entire page layout, borders, color schemes, etc. It may take you to a preview of the converted text, where you can review that it converted correctly, and display the changes as you apply them. This may exist as another mini application within the application.

Another option could be to add a field to manually enter agreement text. This could provide users with a blank field to make entries directly into the app, also including providing a preview of the entered text to review for accuracy for the next page. An option to add a means for downloading the agreement files for review and signature. Icons of files they can download could be displayed, in the same format as the ones uploaded or editable by user as to how they display. An option where selecting a field constitutes a legally binding agreement equivalent to a provided signature. The settings menu may have an option to let user customize the message displayed by the check box, to explain what they are agreeing to for example. An option to upload signed documents would let user choose where uploaded file is stored, how it is delivered, such as by email or through app, sent elsewhere, etc., if it is saved to the hosting or emailed and deleted from the app, if a notification of receipt is emailed to the guest when received. An option to add a customized message next to this guest selection.

An option to add signature to a field on the agreement page could also provide options to add other fields, such as phone number, email, customizable fields to basically create a form that can be filled directly. Opportunities to inquire about pets or vehicles could be included here. Options providing a customizable query experience with the option to provide and define freeform answers, such as character count or language, etc. An option to request a photo ID may be provided including a means to recognize if a submission is actually a photo ID or it may be submitted for manual approval, and saves it, or provides the option to bypass the automatic recognition, directly choosing the manual method. An option to add additional pages beyond or instead of the agreement for rules, special messages, etc. with a settings menu to facilitate various ways of carrying this out, possibly utilizing the word processor-type imbedded mini app they can customize to deliver their desired messages. Settings menu allowing for selection of the quantity of additional pages to be added to be utilized.

An option to add pop ups for additional messages that user may feel would benefit from additional engagement at various points in the process could be customized from the settings menu for this option. The means to edit these messages may provide the user greater benefit if they can be designed with more elements than the most basic word processor might provide, though the previously discussed word processor imbedded app could also include more design elements across all selections when it is offered for editing. The settings for this would offer the pop up to appear at any point during the booking app's flow displayed to the guest. Conventionally offered payment processing options can be added, or app can be programmed to utilize either owner or user as merchant service provider as default or only option.

A menu for authorization settings can be provided in which selection for authorization code for deposits to be embedded can be selected. An option to apply this selection in bulk may be present in this menu. Different authorization coding included for different payment processors if needed. This coding would automatically charge the pricing amount and reserve the user entered maximum deposit for the duration of the stay, and reauthorize as needed for full duration where possible, as entered by user on the chart of the menu for these settings. There may be a clear indication which options this function is available with when displaying payment processing options. There may be straightforward options for claiming the money from deposit if chosen, in full or partial amount options. There may be options to set up recurring monthly and one deposit, for long term also provided. An option for manually approvable bookings by the user may be provided, for example when they have received other payment forms, so that the switch is still set to be triggered on automatically by this selection and turn off based on the timing or the settings utilized for the fully automated flow. In this way, the start may be manually confirmed, then the process follows the system from that point without further action on the user's part being needed.

An option may be provided to provide an order confirmation for the service booking, such as in the form of a thank you page receipt, with options to edit and other customizations such as photos, elements, or layout allowed, possibly through the same word-processing embedded mini app. Recommended spaces for details such as WIFI code, highlighted rules, special directions, and notes may be included. An option may be provided to automatically send a thank you email which can also be customized to be different or have an option to send image of thank you page via email.

Figure 3:
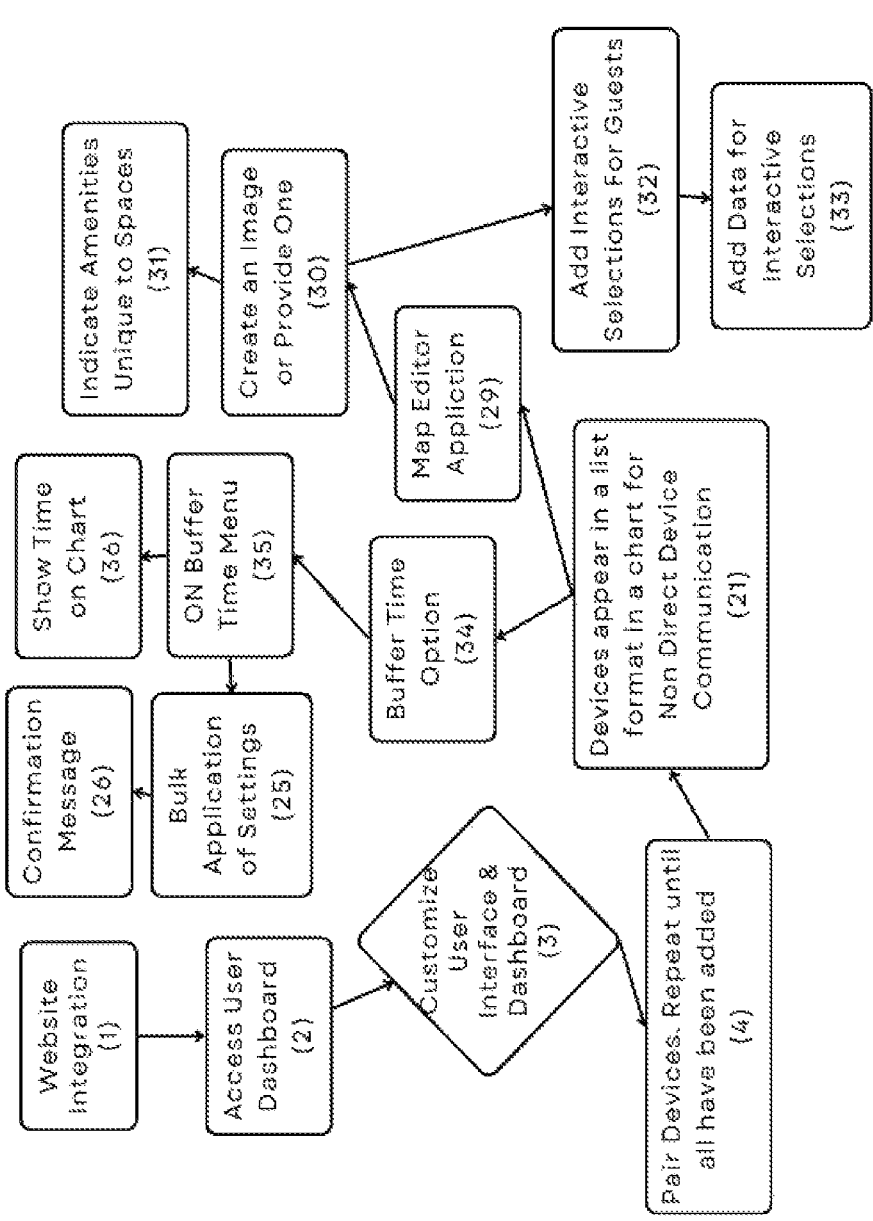
FIG. 3 depicts a flowchart for a method according to an embodiment of the present disclosure.
Figure 3:
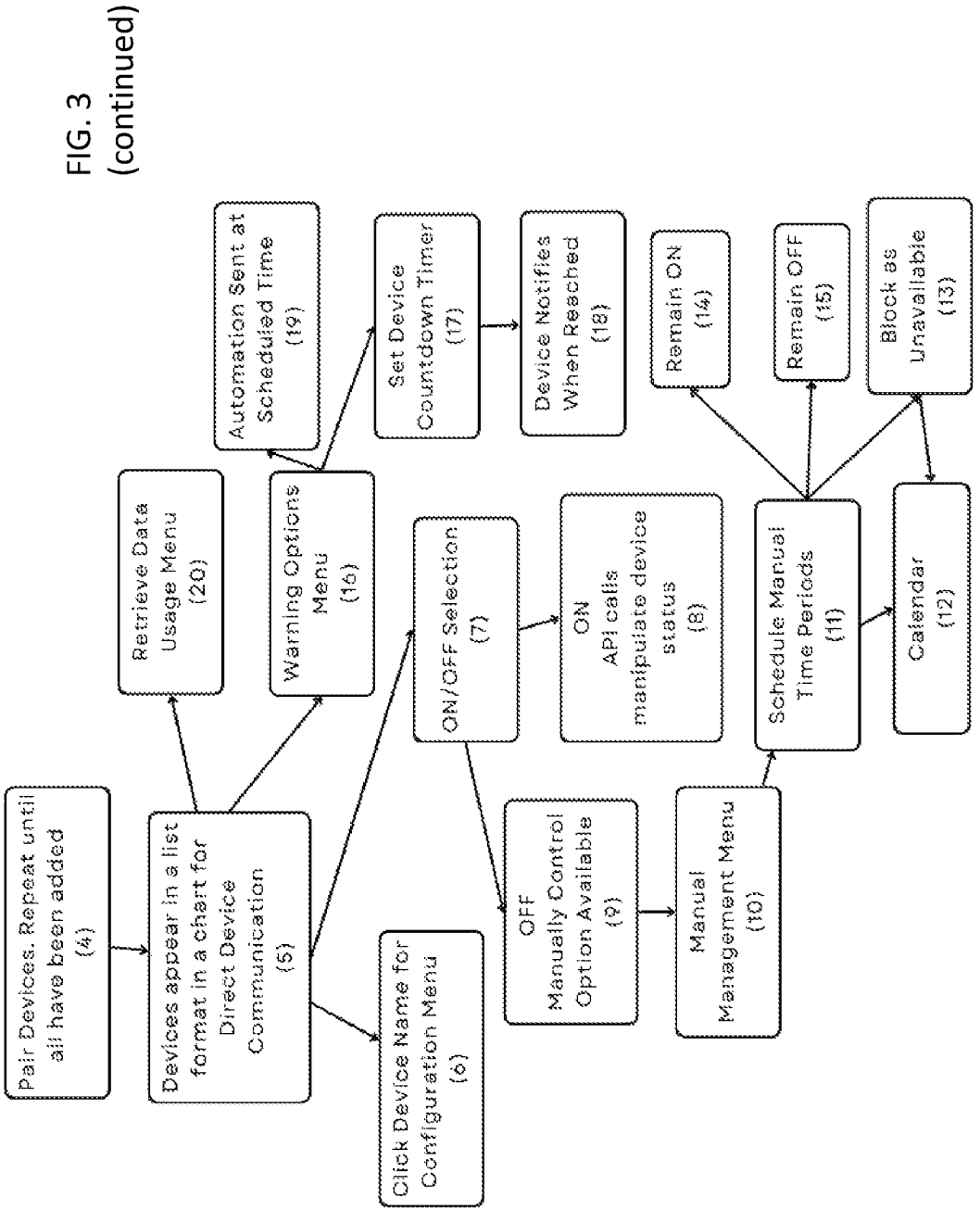
Figure 3:
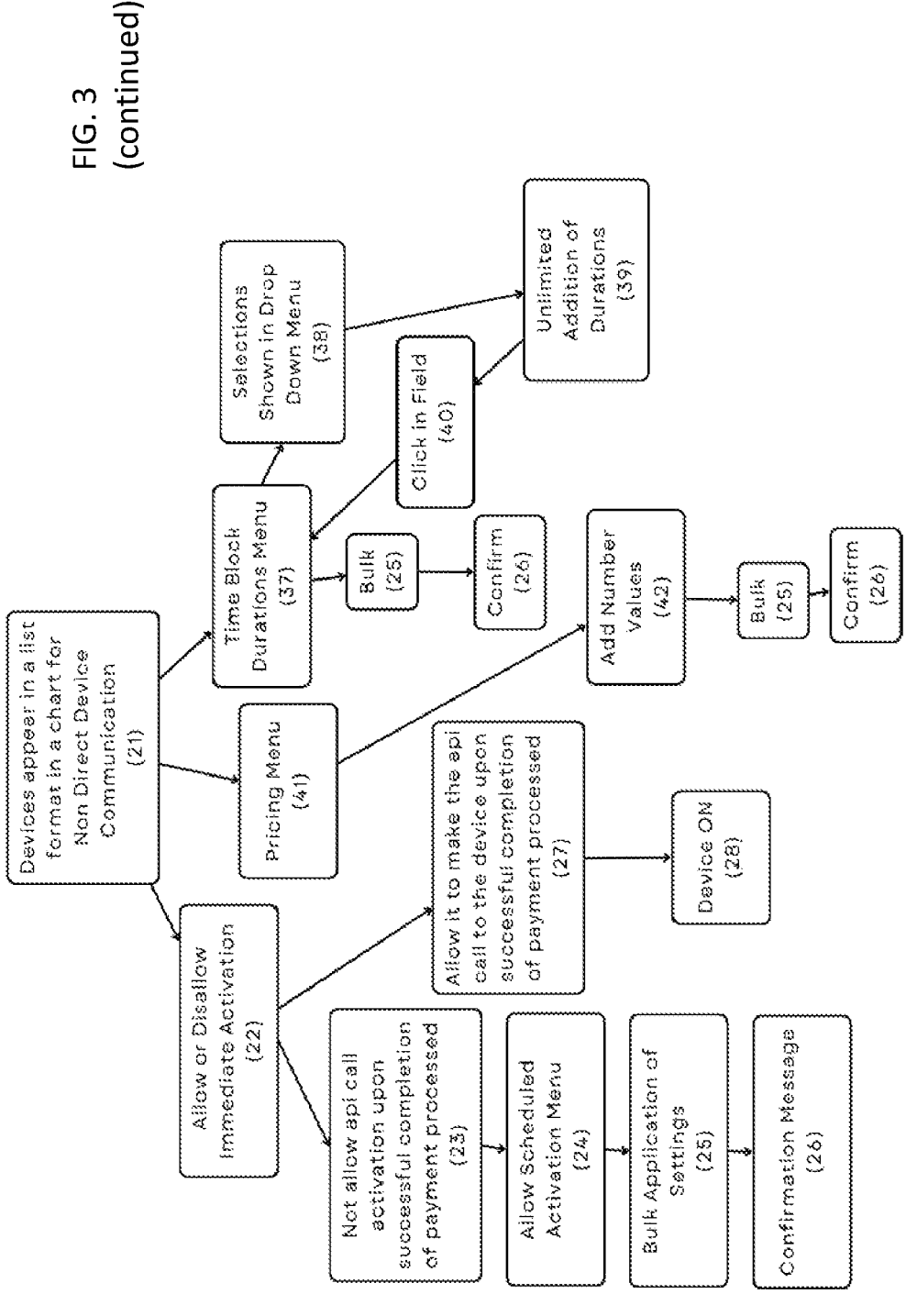
Figure 3:
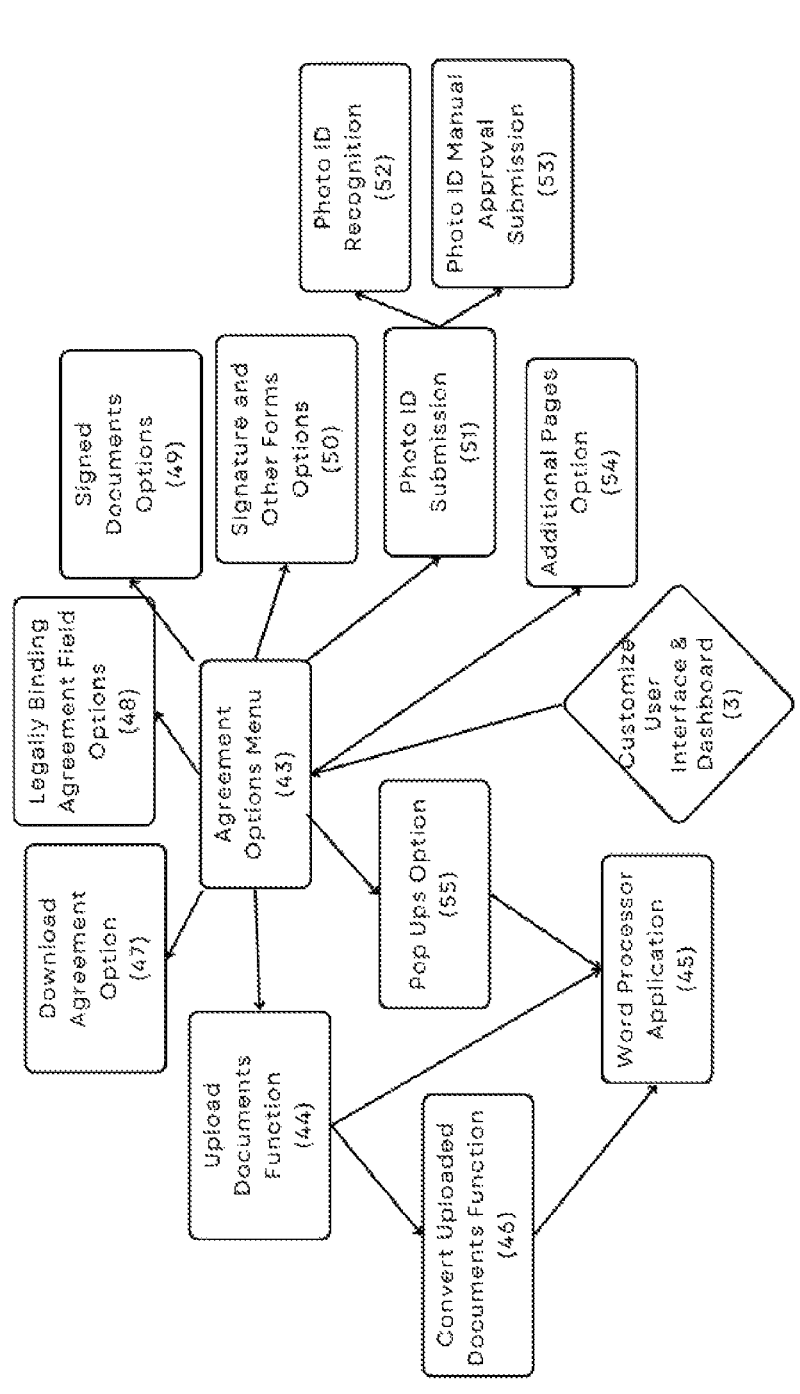
Figure 3:
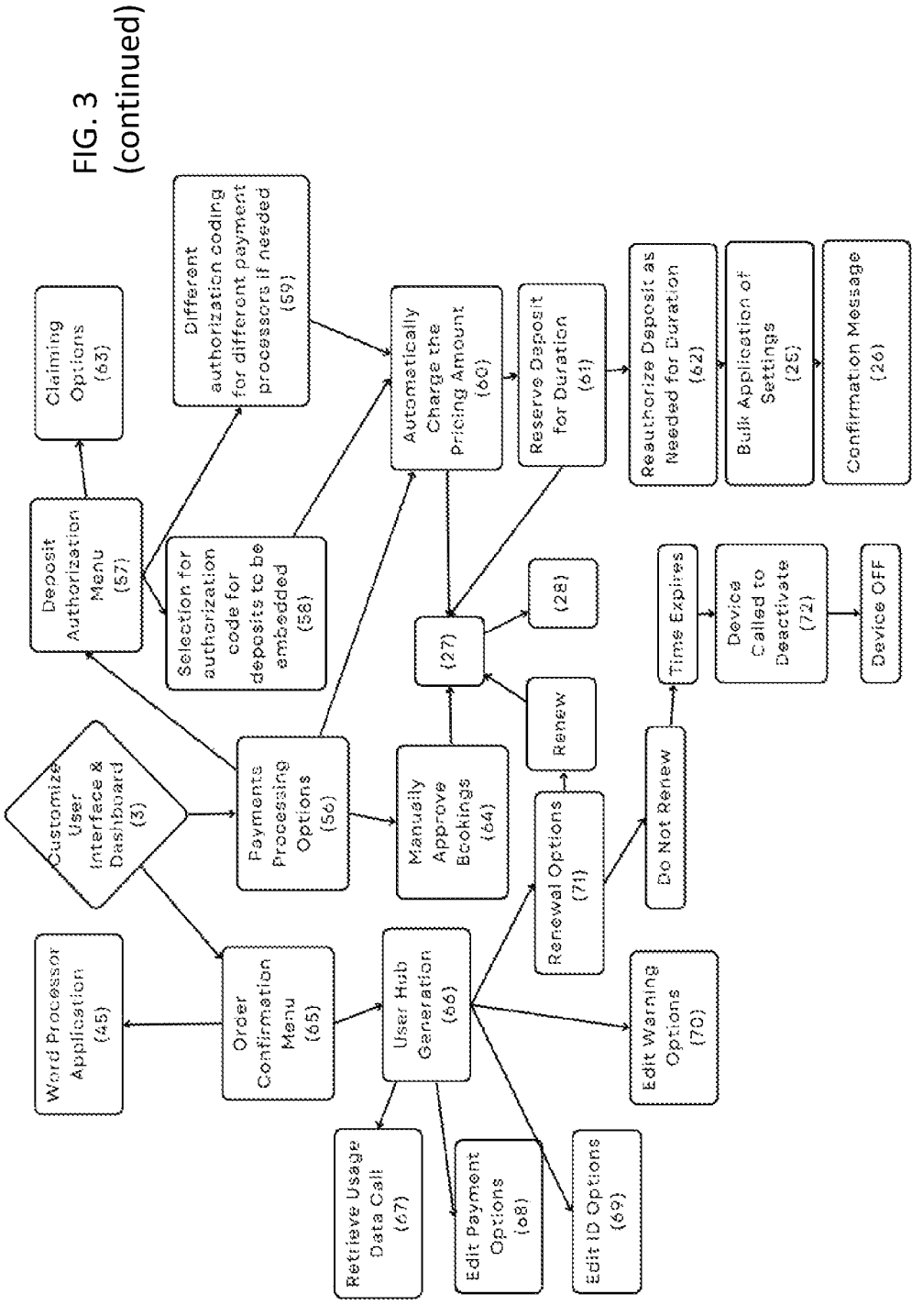

FIG. 3 depicts a flowchart for a method according to an embodiment of the present disclosure. Users search for an application associated with the system to install or otherwise include as part of their website (1). However, it should be appreciated that there may be embodiments where it may be employed as a mobile application without departing from the present disclosure. In step (2), the application may be located, and the user may be taken to the dashboard of the application. In step (3), the user may view the user interface, and design adjustments may be made as desired. Services offered may be edited individually in each field or in a top field for bulk edits. There may be a toggle button in the field in some embodiments of the present disclosure. Devices may be paired until all have been added (4). Devices may appear in a list format in a chart for direct device communication (5). A data usage menu may be retrieved (20). A device name may be selected for a configuration menu (6). A warning options menu may be provided (16) where automation may be sent at a scheduled time (19) or a device may be set with a countdown timer (17). The device may be notified when reached (18). An on/off selection may be provided (7). When off, there may be a manual control option available (9) with a manual management menu (10) allowing manual time periods to be scheduled (11) which may be to remain on (14), remain off (15), and/or block as unavailable (13), and a calendar may be provided (12).

After devices have been paired (4), devices may appear in a list format in a chart for non-direct device communication (21) with a buffer time option (34) to provide an on buffer time menu (35) which may show time on chart (36) or for bulk application of settings (25) with a confirmation message (26). A map editor application may be provided (29) to create an image or provide one (30) and indicate amenities unique to spaces (31). Interactive selections for guests may be added (32), and data for interactive selections may be added (33).

Returning to devices appearing in a list format in a chart for non-direct device communication (21), immediate activation may be allowed or disallowed (22). This may allow it to make the API call to the device upon successful completion of payment processed (27), and the device may be on (28). It also may not allow API call activation upon successful completion of payment processing (23) which may then provide a scheduled activation menu (24) with bulk application of settings (25) and a confirmation message may be provided (26). A pricing menu may be provided (41) where number values may be added (42) in a bulk format in some embodiments (25) and a confirmation may be provided (26). A time block durations menu may be provided (37)

which may be done in bulk (25) and confirmed (26). Selections may be shown in a drop-down menu (38) with unlimited addition of durations (39) and a field may be clicked (40).

An agreement options menu may be provided (43) with pop-up options (55) that may feed into a word processor application (45). The user interface and dashboard may be customized (3) and fed into the agreement options menu (43). A download agreement option (47) may be provided. Legally binding agreement field options (48), signed documents options (49), signature and other forms options (50), additional pages option (54), and/or photo ID submission (51) may be provided through the agreement options menu (43). With photo ID submission (51), there may be photo ID recognition (52) and/or photo ID manual approval submission (53). An upload documents function (42) may be provided through the agreement options menu (43) with an upload documents function (44) which may convert uploaded documents (46) and feed into a word processor application (45).

An order confirmation menu (65) may be provided that may connect with user hub generation (66) which may provide a variety of functions including, but not limited to, retrieve usage data call (67), edit payment options (68), edit ID options (69), edit warning options (70), and/or renewal options (71). If there is no renewal, the time expires, and the device may be called to deactivate (72) with the device turned off. The payment processing options (56) may feed into a deposit authorization menu (57) which may provide selection for an authorization code for deposits to be embedded (58) or different authorization coding for different processors if needed (59). Claiming options (63) also may be provided through the deposit authorization menu (57). The pricing amount may be automatically charged (60) to reserve deposit for the duration (61) and reauthorize deposition as needed for the duration (62). There may be bulk application of settings in this process (25) with a confirmation message (26).

The application dashboard may be viewed which may include one or more sections including, but not limited to, pedestal, manual override, 1-day warning, 1-hour warning, and/or get use data. It should be appreciated that other sections or commands may be provided without departing from the present disclosure. Warnings may be set up, and these warnings may include, but are not limited to, one-day and one-hour warnings. A booking flow may be provided for each pedestal that may enable scheduling between time and time-blocking length. Time selections may be done individually or in bulk in embodiments of the present disclosure. Various time increments or durations may be provided in embodiments of the present disclosure. A map option may be offered in the booking flow. Booking flow may include 12 or 24-hour field, time increments, and time zone to indicate the time zone associated with the user's current location. A map editor option may be available. A service timetable may be selected, and a time of day to use the service may be selected as well as blocking a service user with a chosen time for a pedestal. A smart gadget may be connected, and an account may be created to manage smart devices. The user may then build a cloud development application programming interface (API) for the response and details of each device in an associated account. A smart home option may be chosen, and an API account may be linked to the smart device account. Distribution of application users may be provided, and the owner of the newly added device may now be visible. Authorizations may be added for the built API service where Smart Home Paas API may be the platform for controlling smart devices in an embodiment of the present disclosure. Issues with the application also may be fixed.

Figure 4:
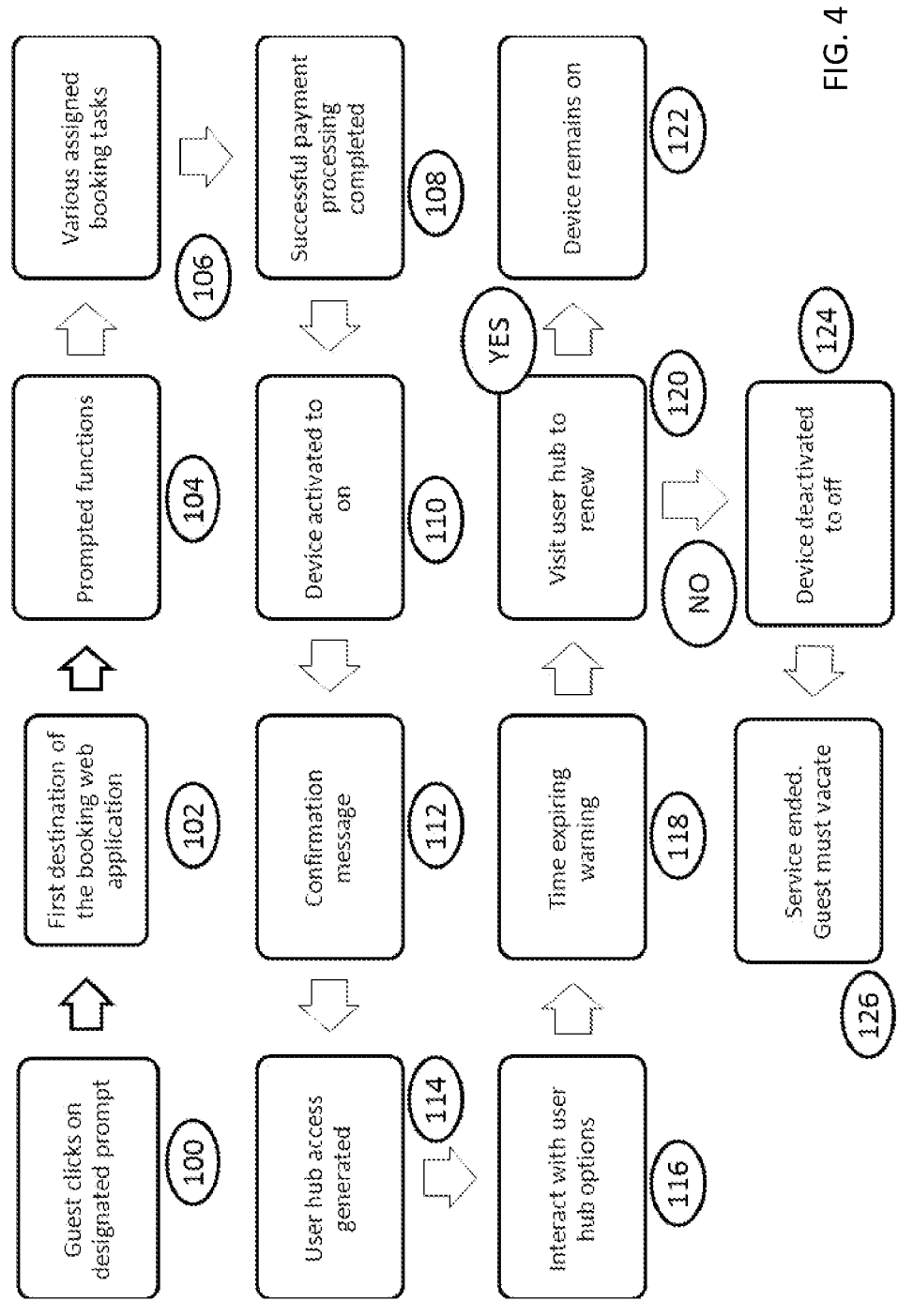
FIG. 4 depicts a user perspective of a method according to an embodiment of the present disclosure.

FIG. 4 depicts a user perspective of a method according to an embodiment of the present disclosure. When a guest clicks on designated prompt 100, the guest may be directed to the first destination of booking web application 102. The guest may progress through the prompted functions that have been assigned by the user 104. When all assigned aspects of the booking have been successfully completed 106 through the final stage of payment processed 108, the API is called for the guest's device to function 110. Any additional calls requested by the user may occur simultaneously, including, but not limited to, confirmation messages 112 and user hub access 114 generated. In the user hub, guests may have options to interact with that have been specified by the user previously 116. Approaching the end of the purchased session, guest may receive a time expiring warning 118. They may visit the user hub to renew service 120. If they do so, the device will remain on 122. Otherwise, the time will be left to expire and the device will be deactivated to off 124, ending the service period, at which point guest must vacate 126. These features may be used without third parties and may operate on multiple devices without extra cost or programming knowledge. Customization may align with user desires and branding needs. It may be offered as a web app for users to add to their sites. An unlimited amount of devices can be utilized with these automations generated along with the ability to add others and customize the entire experience. There will be no need for a mobile app to be downloaded, as even guests can access any needed information through the site booking functions or user hub.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A utility dispensing system for automating dispensation of utilities as licensed services, comprising:

a housing structure for enclosing and protecting components of the system;

a discriminating module capable of remote operation to govern provision and cessation of utilities as licensed services;

a Wi-Fi amplifier to enhance wireless connectivity and enable remote control capabilities;

a plurality of outlets equipped with breakers for delivering power to the transient guests;

a water utility system comprising:

a plurality of water handles and spigots comprising:

a plurality of faucet outlet connection points; and a water control switching device for managing a water supply; and a water line to facilitate distribution of water to designated areas;

hardwired service lines for connecting the utility dispensing system to utility sources;

an antenna for enhancing communication and signal reception;

a card reader for facilitating payment and identification of transient guests;

a radio frequency identification (RFID) chip reader for reading and verifying RFID tags or cards;

a full ID scanner for scanning and verifying identification documents;

at least one camera for monitoring and surveillance purposes;

a plurality of motion sensors for detecting movement and triggering automated actions;

a plurality of lights for illuminating the surrounding area and enhancing security; and a plurality of speakers for audio notifications and alerts.

2. The system of claim 1 further comprising:

a cover to provide additional protection and aesthetics for the utility dispensing system;

a rugged undercoating type material for coating the utility dispensing system, offering durability and resistance against environmental elements; and an ultraviolet (UV) screen protector to shield the utility dispensing system screen from UV damage.

3. The system of claim 1 further comprising:

a utility dispensing system screen for displaying information and user interfaces.

4. The system of claim 1 further comprising:

a quick response (QR) code for facilitating quick and convenient access to information or services.

5. The system of claim 1, wherein the plurality of outlets equipped with breakers include 50/30/20 amp outlets.

6. The system of claim 1, wherein the water control switching device includes a pressure sensor for monitoring and regulating water pressure.

7. The system of claim 1 further comprising:

a weatherproof enclosure for protecting the utility dispensing system from environmental elements.

8. The system of claim 1, wherein the discriminating module performs one or more functions selected from the group comprising:

receiving and validating user identification information, displaying agreements for transient guest acceptance, controlling activation and deactivation of utilities based on predetermined parameters, collecting, processing, and storing user-submitted data, enabling and disabling restricted service based on predetermined parameters, terminating dispensing of services upon expiration of purchased services, connecting to predetermined payment processing options, controlling flow of power as a restricted service, controlling flow of water as a restricted service, controlling internet signal access as a restricted service, receiving user identification documents, receiving user adjustment of payment methods.

9. The system of claim 1, the discriminating module further comprising:

an end-user accessible navigable menu accessible from any location, wherein an end user is capable of directly controlling the system within an active service period.

10. The system of claim 1, the discriminating module further comprising:

smart Wi-Fi meters.

11. The system of claim 1, the discriminating module further comprising:

a user-accessible hub available for utilization during an active service period, the user-accessible hub capable of allowing user control of service restriction or dispensing and/or allowing adjustment of a service period in compliance with an agreement.

12. The system of claim 1, wherein the discriminating module provides one or more options for contact with a controller of the system.

13. The system of claim 1, wherein the discriminating module provides more than one predetermined notification of expiration of a service period, the notification allowing for reactivation or extension of the service period.

14. The system of claim 1, wherein the water control switching device is configured to regulate flow and temperature of water to the designated areas.

15. A method for automating dispensing utilities as licensed services using a utility dispensing system comprising a discriminating module operatively coupled to a utility delivery interface and a utility flow control element integrated within the utility dispensing system, the method comprising:

providing an end-user accessible navigable menu on the utility dispensing system, the menu accessible from any location;

collecting, processing, validating, and storing transient guest-submitted data, the transient guest-submitted data including at least identification information;

verifying payment for the utilities as licensed services;

receiving guest acceptance of an agreement displayed on the menu;

electronically transmitting, by the discriminating module, a control signal to the utility flow control element;

physically enabling, by the utility flow control element in response to the control signal, delivery of the utilities through the utility delivery interface, wherein the utility delivery interface comprises a user-accessible physical outlet configured for direct consumption of the utilities by a transient guest;

monitoring consumption of the activated utilities as licensed services; and electronically transmitting, by the discriminating module, a second control signal to the utility flow control element to physically interrupt delivery of the utilities through the utility delivery interface, thereby terminating physical dispensing of the utilities by the utility dispensing system at the user-accessible physical outlet, independent of operation of any downstream powered device, upon completion of a service duration or when a transient guest requests deactivation.

16. The method of claim 15 further comprising:

generating usage reports and billing information based on consumed utilities as licensed services; and providing access to usage reports and billing information to authorized personnel through a user interface.

17. The method of claim 15 further comprising:

performing remote diagnostics and troubleshooting of the utility dispensing system using a remote monitoring and control system; and maintaining the security and integrity of the utility dispensing system through one or more of cameras, motion sensors, and alarms.

18. The method of claim 15 further comprising:

providing one or more notifications to the transient guest, the notifications selected from the group comprising:

notifications of remaining balance or usage limit of the utilities as licensed services, consumption of the utilities as licensed services, end of service period, issues with service.

19. The method of claim 15 further comprising:

generating invoices or receipts for the utilities as licensed services.

20. The method of claim 15 further comprising:

integrating with a central management system to collect and analyze data regarding utility consumption, billing, and operational performance of the utility dispensing system.

\* \* \* \* \*